(12) United States Patent
Appel et al.

(10) Patent No.: US 11,562,028 B2
(45) Date of Patent: Jan. 24, 2023

(54) CONCEPT PREDICTION TO CREATE NEW INTENTS AND ASSIGN EXAMPLES AUTOMATICALLY IN DIALOG SYSTEMS

(71) Applicant: INTERNATIONAL BUSINESS MACHINES CORPORATION, Armonk, NY (US)

(72) Inventors: Ana Paula Appel, São Paulo (BR); Paulo Rodrigo Cavalin, Rio de Janeiro (BR); Victor Henrique Alves Ribeiro, Rio de Janeiro (BR); Claudio Santos Pinhanez, São Paulo (BR); Gabriel Louzada Malfatti, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 17/006,671

(22) Filed: Aug. 28, 2020

(65) Prior Publication Data
US 2022/0067101 A1  Mar. 3, 2022

(51) Int. Cl.
*G06F 16/9032* (2019.01)
*G06F 40/35* (2020.01)
(Continued)

(52) U.S. Cl.
CPC ........ *G06F 16/90332* (2019.01); *G06F 40/35* (2020.01); *G06F 40/56* (2020.01); *G06N 5/022* (2013.01)

(58) Field of Classification Search
CPC .... G06F 16/90332; G06F 40/35; G06F 40/56; G06N 5/022
See application file for complete search history.

(56) References Cited

U.S. PATENT DOCUMENTS 9,105,268 B2  8/2015  Srivastava et al.
9,269,354 B2  2/2016  Gandrabur et al.
(Continued)

FOREIGN PATENT DOCUMENTS

CN    111144124 A    11/2018
CN    110321564 A    10/2019
(Continued)

OTHER PUBLICATIONS

Bhargava, A. et al., "Easy Contextual Intent Prediction and Slot Detection"; IEEE international Conference on Acoustics, Speech and Signal Processing (2013); pp. pp. 8337-8341.
(Continued)

*Primary Examiner* — Sonia L Gay
(74) *Attorney, Agent, or Firm* — Intelletek Law Group, PLLC; Gabriel Daniel, Esq.

(57) ABSTRACT

A method of automatically creating new intents and assigning examples to those new intents in a dialog system includes generating at least one predicted intent from an intent concept graph by combining two or more nodes of the intent concept graph. A graph embedding is generated of the at least one predicted intent. A sentence embedding is generated from examples from a call log. The graph embedding of the at least one predicted intent is then matched with the examples from the sentence embedding and the at least one predicted intent, with the examples, is connected into a dialog system.

19 Claims, 6 Drawing Sheets

(51) Int. Cl.
　　　*G06F 40/56*　　　(2020.01)
　　　*G06N 5/02*　　　(2006.01)

(56) References Cited

U.S. PATENT DOCUMENTS

| | | | |
|---|---|---|---|
| 9,495,962 | B2 | 11/2016 | Govrin et al. |
| 9,712,671 | B2 | 7/2017 | Monegan et al. |
| 10,191,999 | B2 | 1/2019 | Liu et al. |
| 10,262,062 | B2 | 4/2019 | Chang et al. |
| 10,360,610 | B2 | 7/2019 | Vijayaraghavan et al. |
| 10,614,799 | B2 | 4/2020 | Kennewick, Jr. et al. |
| 2009/0077047 | A1* | 3/2009 | Cooper .............. G06F 16/3344 |
| 2015/0178371 | A1 | 6/2015 | Seth et al. |
| 2016/0062604 | A1* | 3/2016 | Kraljic ................. G06F 3/0482 |
| | | | 715/771 |
| 2020/0026489 | A1* | 1/2020 | Bromand ................ G06F 3/167 |
| 2020/0104653 | A1 | 4/2020 | Solomon et al. |
| 2021/0104234 | A1* | 4/2021 | Zhang .................. G10L 15/197 |
| 2021/0210096 | A1* | 7/2021 | Miyazaki .......... G06F 16/90332 |

FOREIGN PATENT DOCUMENTS

| | | |
|---|---|---|
| CN | 107463658 B | 3/2020 |
| CN | 111209398 A | 5/2020 |
| WO | 2019046463 A1 | 3/2019 |

OTHER PUBLICATIONS

Zhong, J. et al., "Predicting Customer Call Intent by Analyzing Phone Call Transcripts based on CNN for Multi-Class Classification"; arXiv preprint arXiv: 1907.03715 (2019); 12 pgs.

Carignan, B., "Improving Dialog Systems Using Knowledge Graph Embeddings" (Doctoral dissertation, Carleton University 2018); 100 pgs.

Perkins, H et al., "Dialog Intent Induction with Deep Multi-View Clustering"; arXiv preprint arXiv: 1908.11487 (2019); 10 pgs.

Zhang, M. et al., "Link Prediction Based on Graph Neural Networks"; In Advances in Neural Information Processing Systems (2018); pp. 5165-5175.

Zhang, X. et al. "A Joint Model of Intent Determination and Slot Filling for Spoken Language Understanding"; In IJCAI (2016); vol. 16; pp. 2993-2999.

Yao, L. et al., "Graph Convolutional Networks for Text Classification"; In Proceedings of the AAAI Conference on Artificial Intelligence (2019); vol. 33; pp. 7370-7377.

Peng, H. et al., "Hierarchical Taxonomy Aware and Attentional Graph Capsule RCNNs for Large-Scale Multi-Label Text Classification"; IEEE Transactions on Knowledge and Data Engineering (2019); 15 pgs.

Yadati, N. et al., "HyperGCN: A new method for training graph convolutional networks on hypergraphs. In Advances" In Neural Information Processing Systems (2019); pp. 1511-1522.

Sun, C. et al., "Joint Type Inference on Entities and Relations via Graph Convolutional Networks"; In Proceedings of the 57th Annual Meeting of the Association for Computational Linguistics (2019); pp. 1361-1370.

Chen, Y. et al., "Zero-shot learning of intent embeddings for expansion by convolutional deep structured semantic models"; In IEEE International Conference on Acoustics, Speech and Signal Processing (ICASSP—2016); pp. 6045-6049.

Kartsaklis, D. et al., "Mapping Text to Knowledge Graph Entities using Multi-Sense LSTMs"; Proceedings of the 2018 Conference on Empirical Methods in Natural Language Processing (2018); pp. pp. 1959-1970.

Search Report and Written Opinion dated Sep. 24, 2021 in related application PCT/CN2021/101580, 9 pgs.

\* cited by examiner

CONCEPT PREDICTION TO CREATE NEW INTENTS AND ASSIGN EXAMPLES AUTOMATICALLY IN DIALOG SYSTEMS

BACKGROUND

Technical Field

The present disclosure generally relates to conversational artificial intelligence computer systems, and more particularly, to methods and systems for concept prediction to create new intents and assign examples automatically in dialog systems.

Description of the Related Art

The intent-action paradigm used today by computerized conversational systems, such as the IBM Watson® Assistant (WA) framework, involves chatbot developers to provide an extensive list of examples for each intent used in the system. Medium and large-scale dialog systems can include thousands of intents. Call logs may include intent examples that have not yet been handled by a dialog system. Such examples can represent either existing intents or new ones that could be added to the system. This process currently involves the curation of the examples by domain experts (DEs), who will manually create new intents and assign these examples to new intents.

Chatbot developers/domain experts typically manually match sentences in a call log to a new intent or to an intent from an existent large collection of intents. Finding examples from chat logs or human call logs does not work well or is time-consuming and prone to errors.

Domain experts, off-line, define the intents of possible user utterances through a list (e.g., >10) of examples or can also ask the system for recommendations, and then define entities. The examples are processed by the conversational system and a mapping from user utterances to intents is learned.

SUMMARY

According to various embodiments, a computing device, a non-transitory computer readable storage medium, and a method are provided for automatically creating new intents and assigning examples to those new intents in a dialog system.

In one embodiment, a computer implemented method includes generating at least one predicted intent from an intent concept graph by combining two or more nodes of the intent concept graph. A graph embedding is generated of the at least one predicted intent. A sentence embedding is generated from examples from a call log. The at least one predicted intent from the graph embedding is then matched with the examples from the sentence embedding and the at least one predicted intent with the examples is connected into a dialog system. By representing the intents in an intent concept graph, the method can automatically generate new intents without the need for the time and labor of manual user input.

In some embodiments, the at least one predicted intent includes a plurality of predicted intents and the method further comprises ranking the plurality of predicted intents. In some embodiments, the ranking of the plurality of predicted intents is based on a number of nodes that two or more nodes of the precited intent have in common. In some embodiments, the edges between connected nodes of the intent concept graph are directional edges.

In some embodiments, the method further includes verifying the at least one predicted intent in terms of performance against examples from the call log. In some embodiments, the step of verifying the at least one predicted intent in terms of performance is performed automatically. In some embodiments, the step of verifying the at least one predicted intent in terms of performance is performed by displaying the at least one predicted intent and the examples matched thereto for user verification.

In some embodiments, the method further comprises performing a random walk of the intent concept graph to generate the at least one predicted intent.

In some embodiments, the method further comprises matching language from the call log to existing nodes of the intent concept graph to generate the at least one predicted intent in the intent concept graph.

According to various embodiments, a computerized conversation system comprises a computerized conversation agent configured to receive a query from an end user and output an answer to the end user and a concept prediction module configured to automatically predict at least one new intent based on a set of existing intents represented by an intent concept graph and to automatically associate the at least one new intent to at least one example in a call log.

According to various embodiments, a non-transitory computer readable storage medium tangibly embodies a computer readable program code having computer readable instructions that, when executed, causes a computer device to carry out a method of improving computing efficiency of a computerized dialog system. The method comprises generating at least one predicted intent from an intent concept graph by combining two or more nodes of the intent concept graph. The method further includes generating a graph embedding of the at least one predicted intent and generating a sentence embedding from examples from a call log. The method further includes matching the at least one predicted intent with the examples from the sentence embedding and connecting the at least one predicted intent with the examples into a dialog system.

By virtue of the concepts discussed herein, a tool is provided that improves upon the transfer of knowledge to a computerized conversation system. These concepts can assure expressiveness, scalability and efficiency of such conversation systems and further enable the finding of conflicts and interferences among sets of intents, while supporting the search of knowledge areas that are not covered by the existing intents.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1A:
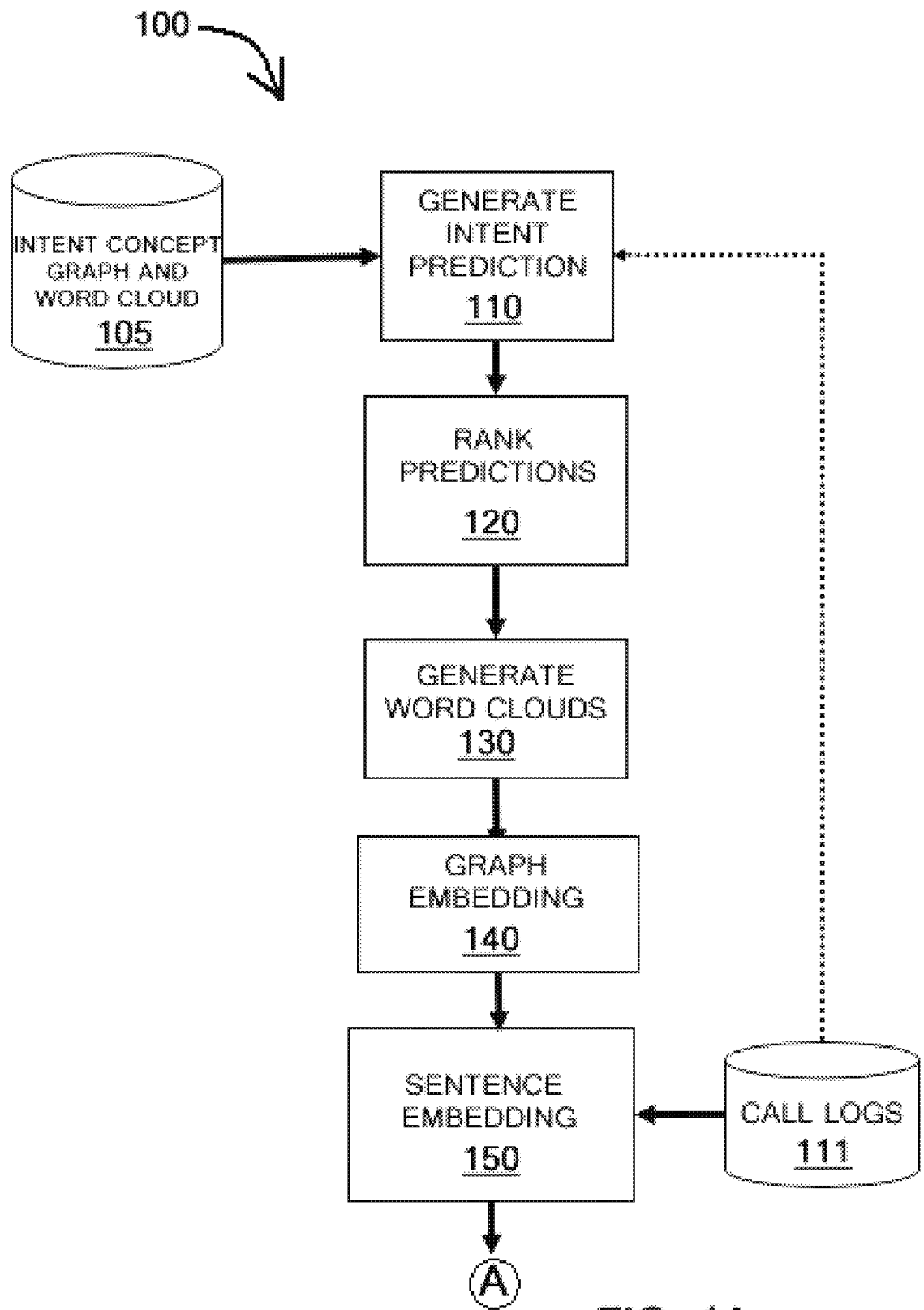
FIGS. 1A and 1B are a flow chart illustrating an overall method for automatically creating new intents and automatically assigning examples with the new intents in a dialog system, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems and computerized methods of automatically creating new intents and automatically assigning examples with the new intents in a dialog system, also referred to herein as a computerized dialog system or computerized conversational system. The systems and computerized methods provide a technical improvement in the efficiency and accuracy of computer systems by speeding up the creation, deployment and integration of concepts identified in call logs and mapped to intents within a computerized conversational system. The systems and computerized methods can assure expressiveness, scalability, and efficiency in computerized conversational systems by automatically creating new intents and automatically assigning examples with the new intents.

As used herein, a "computerized conversational system", or a "virtual assistant" or a "dialog system" refers to an intent-based conversation artificial intelligence system that can derive an intent from an end user's query and provide a predetermined answer based on that intent. An "intent" refers to the motive of an end user. It is the intention behind each message that the computerized conversational system receives. Intent relates to what the user wants to get out of the interaction. For example, if an end user asks, "What does it cost for making a late payment", the system can determine the intent behind the message is to check the user's account information and provide the late payment fee for that account. Therefore, an intent-based computerized conversational system can operate to identify the meaning the message from the end user is trying to convey, instead of relying on the specific input.

An intent-based computerized conversational system looks for key terms and "entities" in the messages it receives. Entities are variables that inform the intent of the message. For example, a user can ask the system, 'What will the weather be like in New York on Friday?' The intent is to find out the weather. The terms "New York" and "Friday" are entities which specify the information the user seeks.

Call logs can include intent examples that have not yet been handled by the dialog system. Such examples can represent either existing intents or new ones that could be added to the system. As discussed in greater detail below, aspects of the present disclosure can take advantage of intents being represented as a graph, where each intent is represented by a set of inter-connected concepts, which can be either high-level concepts or low-level word clouds extracted from the examples. The concept graph can then be used to predict new intents and associate them to examples in the call logs. The predicted new intents can be visualized in a graphical user interface by domain experts, who can review the results of the system manually, as desired.

Reference now is made in detail to the details illustrated in the accompanying drawings and discussed below.

Figure 1B:
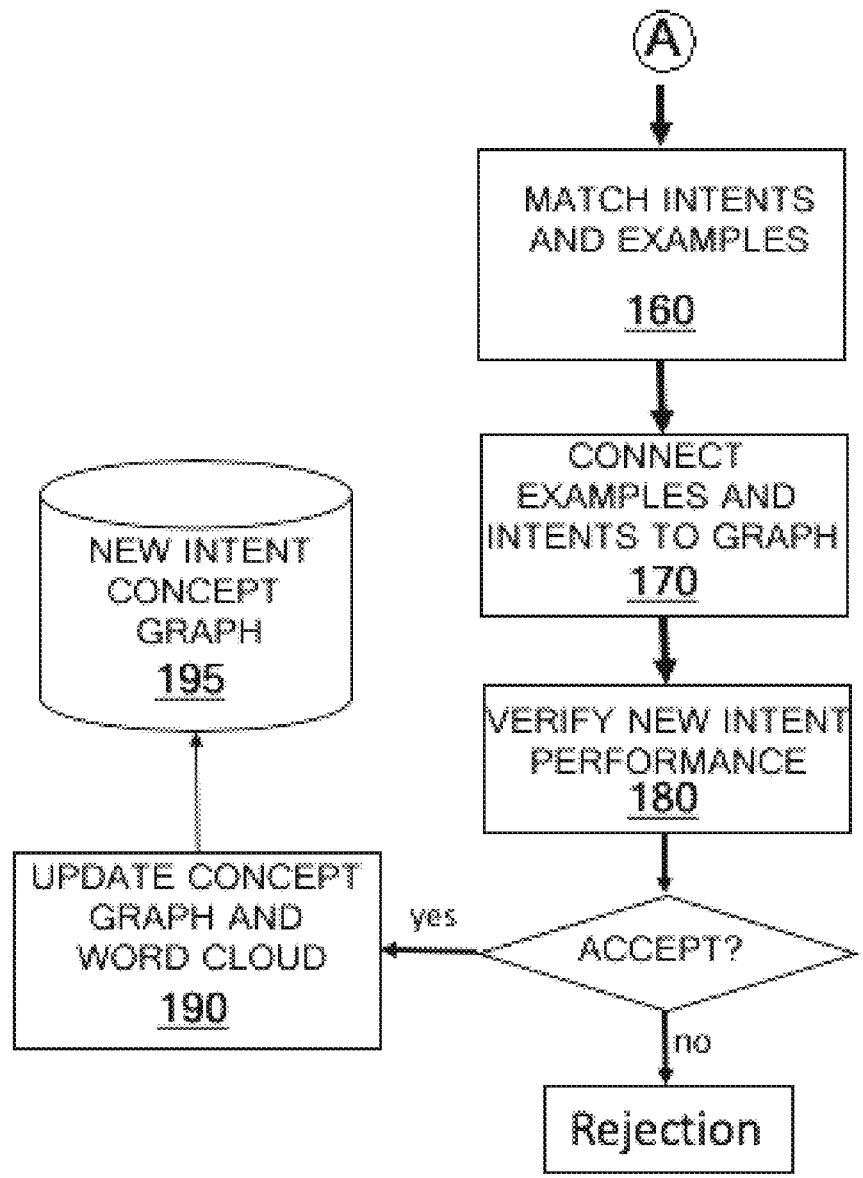

Referring to FIGS. 1A and 1B, a method 100 for automatically creating new intents and automatically assigning examples with the new intents in a dialog system is shown, consistent with an illustrative embodiment. At act 105, an input is provided, where a graph with intents represented as inter-connected concepts and word clouds, which are the words related to low-level representations of the concepts. The intents are either computed from intent examples or manually associated to the concepts by the user. An example of such an intent-concept graph is discussed below with respect to FIG. 3.

The intent-concept graph can be used to suggest new probable intents at act 110, using a score based on how many nodes that two nodes have in common. This is different from traditional link prediction since the intent-concept graph has directions associated with it and, accordingly, traditional link prediction does not work. The directional edges illustrate a general order of the words arranged in the predicted concepts, as described below. Random walk through the intent-concept graph may also be used because the new intent could be a different walk through of different intents. Further, examples from call logs 111 may be used to help determine new intents.

With the new intents identified, at act 120, the new intents can be ranked based on the intent prediction score. Given that an intent can be represented by a sequence of concepts, the new intents could be made to be placed in the beginning, middle, or at the end of that sequence of concepts.

At act 130, a word cloud of the new intents can be generated. At act 140, the graph embeddings of the new intents can be generated. This can be performed with standard graph embeddings methods, such as DeepWalk, NodeToVec or using graph convolutional neural networks, for example.

At act 150, the sentence embeddings for each call log example can be generated. This can be performed by way of sentence embeddings, such as BERT and USE, for example.

At act 160, the new intent embeddings can be matched with the embedding of the examples from the call logs 111 by making use of standard machine learning mapping methods, for example.

At act 170, the new intent can be connected with examples in the dialog system as a result of the mapping done at act 160. At act 180, the inclusion of the new proposed intent is verified in terms of performance, which can be done in an automated fashion, without requiring input from a user or domain expert. For example, the new proposed intent may be used in call log responses to determine if appropriate responses are generated. However, a user may be involved in this process to review if these new intents and examples are satisfactory. In this respect, a user interface can be provided to permit the user to review the new intents and examples as a further verification.

If the inclusion of the new proposed intent is approved (Accept=YES), then, at act 190, the intent-concept graph and word cloud from the input are updated, as shown in act 195. If the inclusion of the new proposed is not approved (Accept=NO), the new intents are discarded and the graph from the input remains the same.

Figure 2:
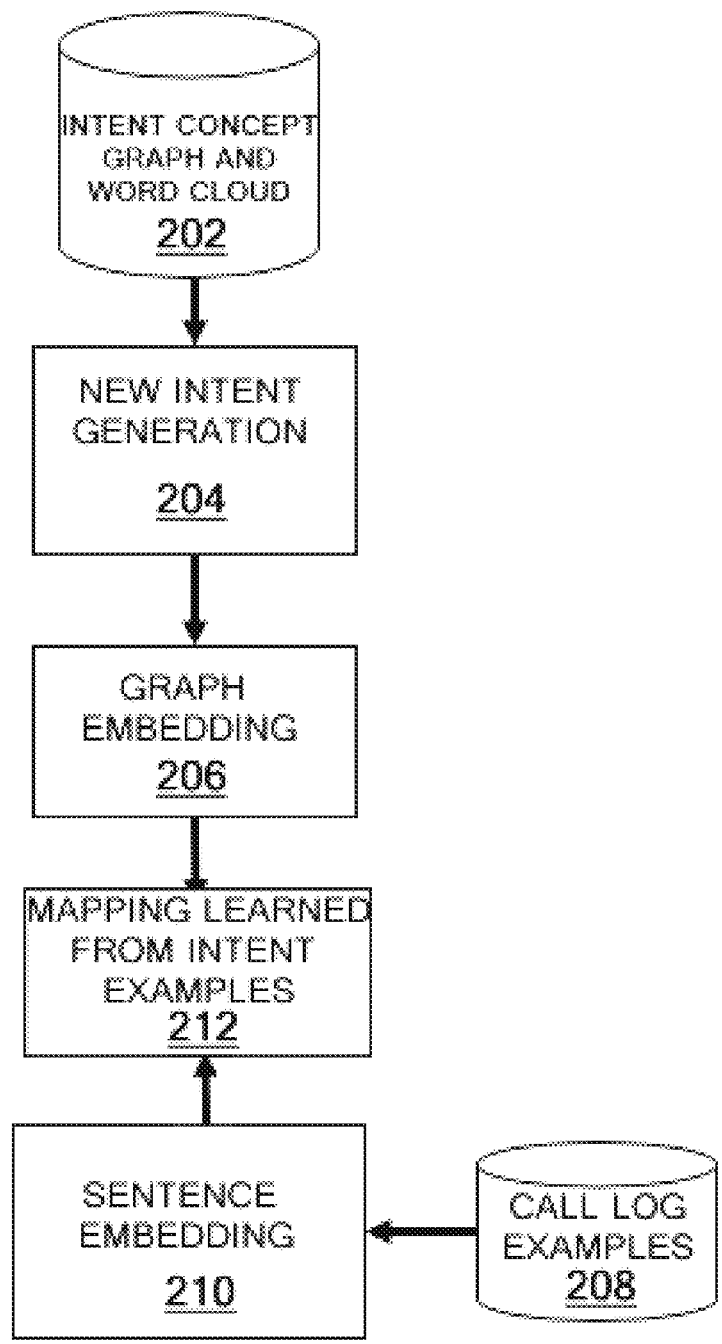
FIG. 2 is a graphical representation illustrating steps followed by a system for automatically creating new intents and automatically assigning examples with the new intents, consistent with an illustrative embodiment.

FIG. 2 illustrates a schematic representation of an example of data flow 200 in the method 100 of FIGS. 1A and 1B. Additional details are provided below with respect to FIGS. 3 and 4. A concept graph 202 can include linking of words from examples to intents. The system can form a new intent prediction 204 by linking concepts or by random walks about the concept graph. The system can embed the new intents into the concept graph by graph embedding 206, such as deepwalk, NodetoVec, or the like. Further, call log examples 208 can be used for sentence embedding 210. The graph embedding 206 and sentence embedding 210 can be used for mapping 212 learned from intent examples by, for example, mean square error (MSE) methods.

Figure 3:
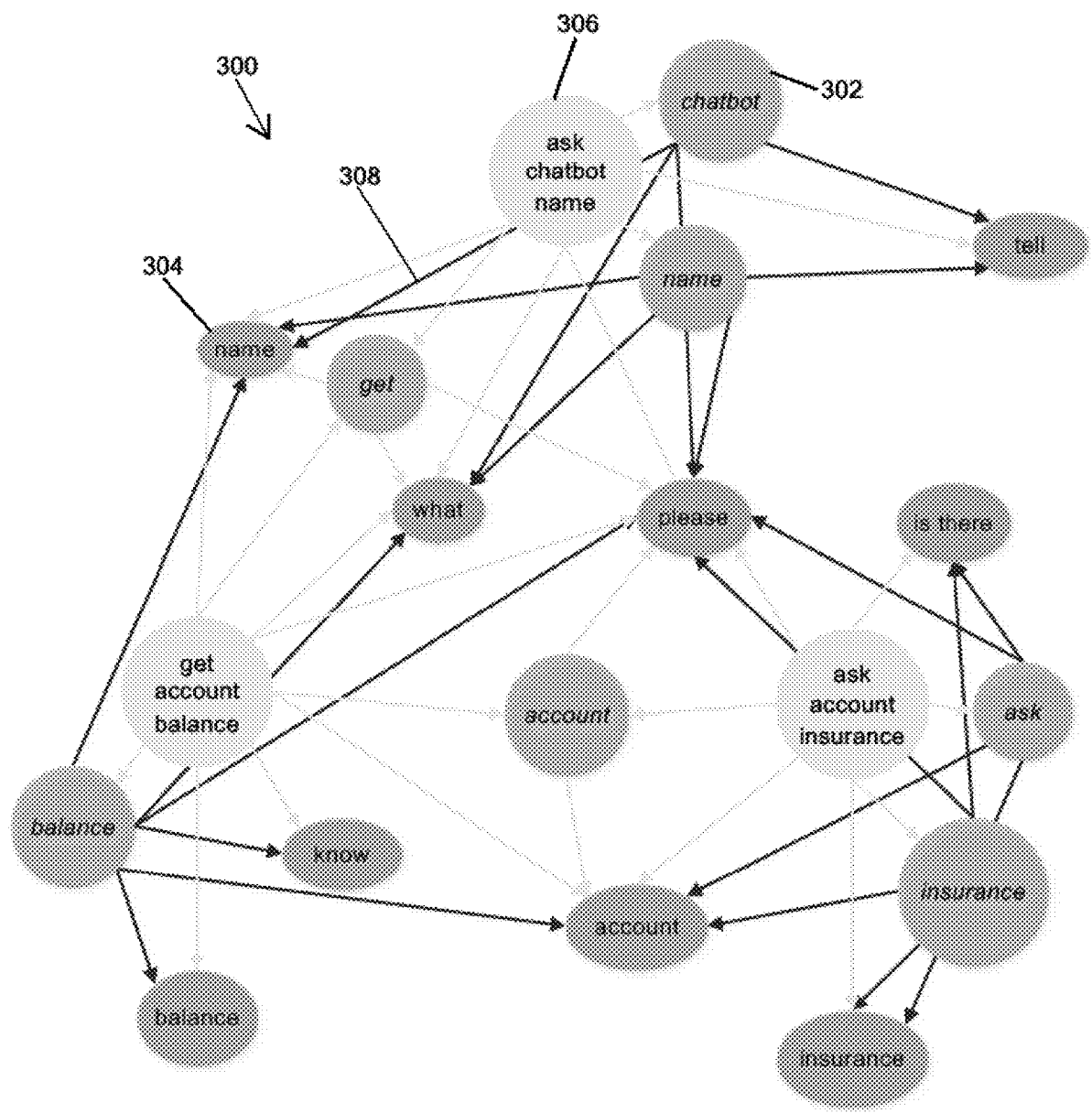
FIG. 3 is an exemplary word graph illustrating an initial training to add knowledge into the word graph.

FIG. 3 illustrates an example of a word graph plus taxonomy 300. The darker background nodes, such as the node for chatbot 302, are concept nodes. The lighter background nodes, such as the node for name 304, are word nodes. The nodes may be connected by edges 306 that connect to form classes 308. The chart below illustrates exemplary classes with training examples, such as examples from call logs, used to designate the classes.

| Class | Training Example |
| --- | --- |
| get_chatbot_name | What is your name? |
|  | Could you please tell me your name? |
| get_account_balance | What is the balance in my account please? |
|  | I would like to know the balance |
|  | of the account in my name. |
| ask_account_insurance | Is there an insurance for my account |

Given a concept $\lambda \in \Lambda$, the set $\Omega(\lambda) \subseteq \Omega$ contains all classes which have in its associated set of words:

$$\Omega(\lambda) = \bigcup_{\substack{i=1 \\ \lambda \in \Lambda^i}}^{c} \{\omega_i\}$$

$$U(\lambda) = \bigcap_{\substack{i=1 \\ \lambda \in \Omega(\lambda)}}^{c} U_i$$

To compute the set $U(\lambda)$, the w-cloud of the concept which includes all the words that belong to every w-cloud of the conceptual representations which include A. For example, based on FIG. 3, the following equations are defined:

$U(get)=U(\omega 1)\cap U(\omega 2)=\{what, name, please\}$;
$U(chatbot)=U(\omega 1)=\{what, name, please, tell\}$;
$U(name)=U(\omega 1)=\{what, name, please, tell\}$;
$U(account)=U(\omega 2)\cap U(\omega 3)$ $\{please, account\}$;
$U(balance)=U(\omega 2)=\{what, name, please, tell, balance, know, account\}$;
$U(ask)=U(\omega 3)=\{please, is there, insurance, account\}$; and
$U(insurance)=U(\omega 3)=\{please, is there, insurance, account\}$.

Figure 4:
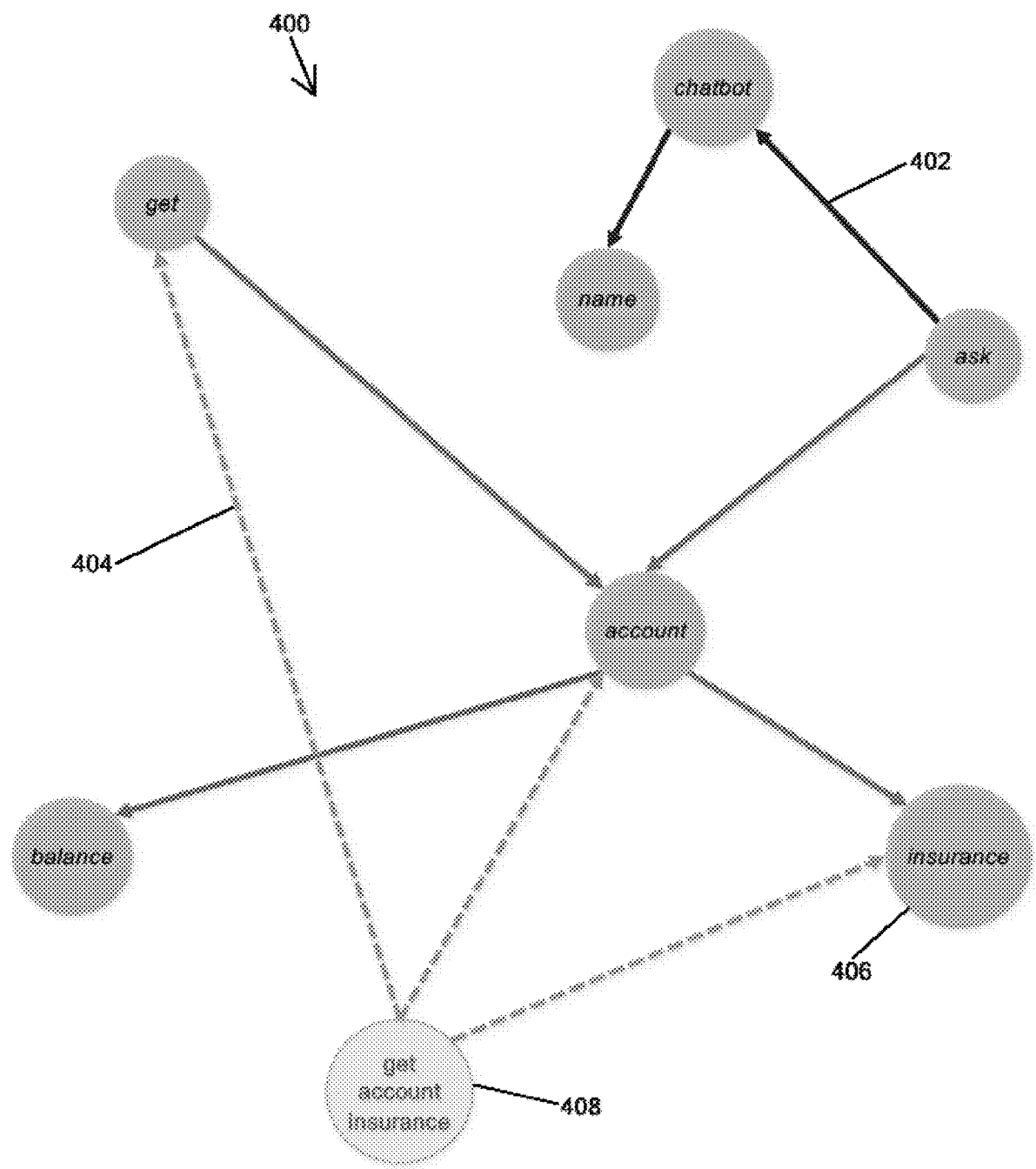
FIG. 4 is an exemplary concept graph illustrating the automatic prediction of a new node in the concept graph.

Referring to FIG. 4, a concept graph 400 plus link prediction is shown. Here, the solid edges, such as edge 402, indicates edges already in the concept graph. The dashed edges, such as dashed edge 404, indicate a possible intent 408 formed from linked concepts (or notes 406) in the concept graph 400. Based on the above chart of classes from the training examples, a further class of "get_account_insurance" may be an intent prediction. Examples of this intent may be retrieved from the call logs, as discussed above, to provide dialog system examples that may be mapped to the predicted intent.

A new intent clustering algorithm may include finding new intents with link prediction on the taxonomy graph, such as the graph of FIG. 3, extending the word graph plus taxonomy with the word graph of the predicted new intents; recomputing the graph embedding and the MSE mapping; mapping utterances from the chatlogs into an extended intent space; looking for predicted intents with a high number of utterances nearby; and returning top predicted intents, including associated taxonomy and examples. The number of common nodes to a word or concept may be used to rank predicted intents.

While the above example of "get_account_insurance" is a new node prediction, the system may also predict new edges. In the example of FIG. 4, a new edge may be established between "name" and "account". With such new edge, the system may predict a new intent of "get_account_name", for example.

Figure 5:
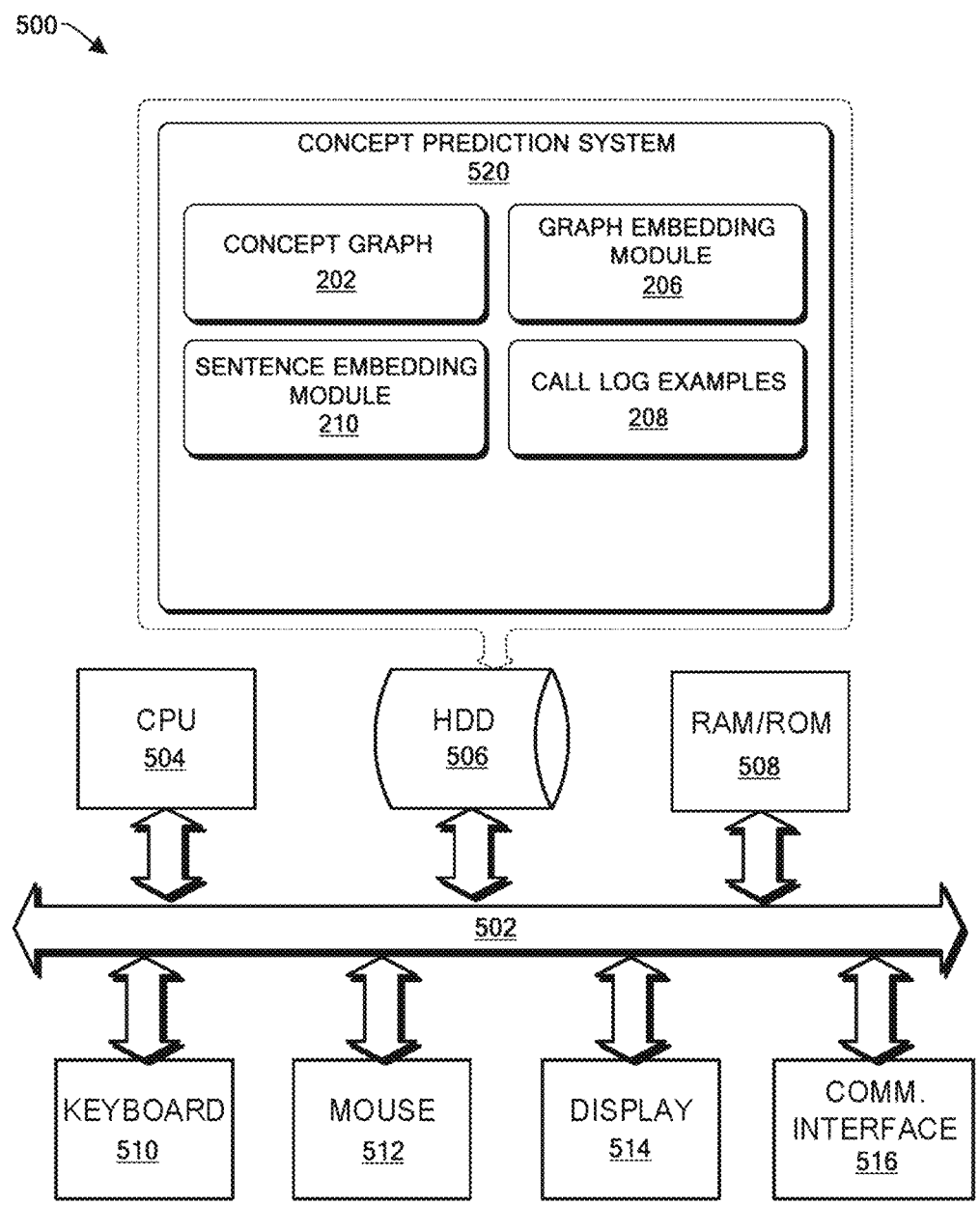
FIG. 5 is a functional block diagram illustration of a computer hardware platform that can be used to implement a particularly configured computing device that can host a system for automatically creating new intents and automatically assigning examples with the new intents in a dialog system, consistent with an illustrative embodiment.

FIG. 5 provides a functional block diagram illustration of a computer hardware platform 500 that can be used to implement a particularly configured computing device that can host a concept prediction system 520 for a computerized conversation system, such as the concept prediction system described with respect to method 100 described above. The concept prediction system 520 can predict concepts to automatically create new intents and assign examples to those intents. In particular, FIG. 5 illustrates a network or host computer platform 500, as may be used to implement an appropriately configured concept prediction system 520.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the concept prediction system 520, in a manner described herein. The concept prediction system 520 may have various modules configured to perform different functions. For example, there may be a concept graph 202, the sentence embedding module 210, the graph embedding module 206 and the call logs examples 208, as described above with respect to FIG. 2.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method comprising:
generating at least one predicted intent from an intent concept graph comprising a plurality of nodes, by combining two or more nodes of the plurality of nodes;
generating a graph embedding of the at least one predicted intent;
generating a sentence embedding from examples from a call log;
matching the at least one predicted intent in the graph embedding with the examples from the sentence embedding; and
connecting the at least one predicted intent with the examples into a dialog system.

2. The computer implemented method of claim 1, wherein the at least one predicted intent includes a plurality of predicted intents and the method further comprises ranking the plurality of predicted intents.

3. The computer implemented method of claim 2, further comprising ranking the plurality of predicted intents based on a number of nodes that two or more nodes of the predicted intent have in common.

4. The computer implemented method of claim 3, wherein edges between connected nodes of the intent concept graph are directional edges.

5. The computer implemented method of claim 1, further comprising verifying the at least one predicted intent in terms of performance against examples from the call log.

6. The computer implemented method of claim 5, further comprising automatically verifying the at least one predicted intent in terms of performance against examples from the call log.

7. The computer implemented method of claim 5, wherein verifying the at least one predicted intent in terms of performance comprises:
displaying the at least one predicted intent and the examples matched thereto on a user interface of the computing device; and
receiving a confirmation from a user via the user interface.

8. The computer implemented method of claim 1, further comprising performing a random walk of the intent concept graph to generate the at least one predicted intent.

9. The computer implemented method of claim 1, further comprising matching language from the call log to existing nodes of the intent concept graph to generate the at least one predicted intent in the intent concept graph.

10. A computerized conversation system comprising:
a computerized conversation agent configured to receive a query from an end user and output an answer to the end user; and
a concept prediction module configured to:
automatically predict at least one new intent based on a set of existing intents represented by an intent concept graph and to automatically associate the at least one new intent to at least one example in a call log;
generate a graph embedding of the at least one new intent, generate a sentence embedding from examples from the call log;
match the at least one new intent from the graph embedding with the examples from the sentence embedding; and
connect the at least one new intent with the examples into a dialog system.

11. The computerized conversation system of claim 10, wherein the at least one new intent includes a plurality of new intents and the concept prediction module is further configured to rank the plurality of new intents based on a number of nodes that two or more nodes of the predicted intent have in common.

12. The computerized conversation system of claim 10, wherein the concept prediction module is configured to automatically verify the at least one new intent in terms of performance against examples from the call log.

13. The computerized conversation system of claim 10, wherein the concept prediction module is configured to display the at least one new intent and the examples associated thereto on a user interface and to receive a confirmation from a user by user interface.

14. A non-transitory computer readable storage medium tangibly embodying a computer readable program code having computer readable instructions that, when executed, causes a computer device to carry out a method of improving computing efficiency of a computing device operating a dialog system, the method comprising:
generating at least one predicted intent from an intent concept graph by combining two or more nodes of the intent concept graph;
generating a graph embedding of the at least one predicted intent;
generating a sentence embedding from examples from a call log;
matching the at least one predicted intent from the graph embedding with the examples from the sentence embedding; and
connecting the at least one predicted intent with the examples into a dialog system.

15. The non-transitory computer readable storage medium of claim 14, wherein:
the at least one new intent includes a plurality of new intents; and
the execution of the code by the processor further configures the computing device to perform an act comprising ranking the plurality of predicted intents based on a number of nodes that two or more nodes of the predicted intent have in common.

16. The non-transitory computer readable storage medium of claim 14, wherein the execution of the code by the processor further configures the computing device to perform an act comprising automatically verifying the at least one predicted intent in terms of performance against examples from the call log.

17. The non-transitory computer readable storage medium of claim 14, wherein the execution of the code by the processor further configures the computing device to perform an act comprising:
- displaying the at least one predicted intent and the examples matched thereto on a user interface of the computing device; and
- receiving a confirmation from a user via the user interface.

18. The non-transitory computer readable storage medium of claim 14, wherein the execution of the code by the processor further configures the computing device to perform an act comprising performing a random walk of the intent concept graph to generate the at least one predicted intent.

19. The non-transitory computer readable storage medium of claim 14, wherein the execution of the code by the processor further configures the computing device to perform an act comprising matching language from the call log to existing nodes of the intent concept graph to generate the at least one predicted intent in the intent concept graph.

* * * * *